US008628856B2

(12) United States Patent
Iwamoto et al.

(10) Patent No.: US 8,628,856 B2
(45) Date of Patent: Jan. 14, 2014

(54) INTERMEDIATE FILM FOR LAMINATED GLASS, AND LAMINATED GLASS

(75) Inventors: Tatsuya Iwamoto, Kouka (JP); Kohei Kani, Kouka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/518,338

(22) PCT Filed: Dec. 24, 2010

(86) PCT No.: PCT/JP2010/073302
§ 371 (c)(1),
(2), (4) Date: Jun. 21, 2012

(87) PCT Pub. No.: WO2011/078314
PCT Pub. Date: Jun. 30, 2011

(65) Prior Publication Data

US 2012/0288722 A1 Nov. 15, 2012

(30) Foreign Application Priority Data

Dec. 25, 2009 (JP) ................................. 2009-294970

(51) Int. Cl.
*B32B 17/10* (2006.01)
*B32B 27/42* (2006.01)

(52) U.S. Cl.
USPC ............ 428/436; 428/437; 428/524; 428/525

(58) Field of Classification Search
USPC ................................. 428/436, 437, 524, 525
See application file for complete search history.

(56) References Cited

U.S. PATENT DOCUMENTS 7,468,209 B2 * 12/2008 Toyama et al. ............... 428/437

FOREIGN PATENT DOCUMENTS

| | | | |
|---|---|---|---|
| JP | 7-247139 | A | 9/1995 |
| JP | 10-25390 | A | 1/1998 |
| JP | 2001-261383 | A | 9/2001 |
| JP | 2007-70200 | A | 3/2007 |
| JP | 2007-331964 | A | 12/2007 |

OTHER PUBLICATIONS

International Preliminary Report on Patentability for Application No. PCT/JP2010/073302 mailed Aug. 23, 2012.
International Search Report for the Application No. PCT/JP2010/073302 mailed Mar. 15, 2011.

* cited by examiner

*Primary Examiner* — D. S. Nakarani
(74) *Attorney, Agent, or Firm* — Cheng Law Group, PLLC

(57) ABSTRACT

An interlayer film for a laminated glass includes a first layer, a second layer laminated on one face of the first layer. Each of the first layer and the second layer contains a polyvinyl acetal resin and a plasticizer. The hydroxyl content of the polyvinyl acetal resin in the first layer is lower than the hydroxyl content of the polyvinyl acetal resin in the second layer. The difference between the hydroxyl content of the polyvinyl acetal resin in the first layer and the hydroxyl content of the polyvinyl acetal resin in the second layer is at most 9.2 mol %. If the difference in the content is higher than 8.5 mol % and at most 9.2 mol %, a degree of acetylation of the polyvinyl acetal resin of the polyvinyl acetal resin in the first layer is at most 8 mol %.

20 Claims, 1 Drawing Sheet

11
1
2a
3a
12
3
2
4
13
2b
4a

INTERMEDIATE FILM FOR LAMINATED GLASS, AND LAMINATED GLASS

TECHNICAL FIELD

The present invention relates to an interlayer film for a laminated glass that has a multilayer structure including at least two layers. More specifically, the present invention relates to an interlayer film for a laminated glass, each layer of which contains a polyvinyl acetal resin and a plasticizer; and a laminated glass including the interlayer film for a laminated glass.

BACKGROUND ART

A laminated glass is a safety glass which, even when broken by impact from the outside, shatters into few flying glass fragments. For this reason, a laminated glass is widely used for cars, rail cars, aircrafts, boats and ships, buildings, and the like. The laminated glass is produced by sandwiching an interlayer film for a laminated glass between a pair of glass plates.

Patent Document 1 provides one example of the interlayer film for a laminated glass; that is, Patent Document 1 teaches a sound insulation layer that contains 100 parts by weight of a polyvinyl acetal resin having a degree of acetalization of 60 to 85 mol %, 0.001 to 1.0 part by weight of at least one metal salt of alkali metal salts and alkaline earth metal salts, and 30 parts by weight or more of a plasticizer. This sound insulation layer alone can be used as an interlayer film.

Patent Document 1 also teaches a multilayer interlayer film in which the sound insulation layer and another layer are laminated. The another laminated on the sound insulation layer contains 100 parts by weight of a polyvinyl acetal resin having a degree of acetalization of 60 to 85 mol %, 0.001 to 1.0 part by weight of at least one metal salt among alkali metal salts and alkaline earth metal salts, and 30 parts by weight or less of a plasticizer.

Patent Document 1: JP 2007-070200 A

SUMMARY OF THE INVENTION

Problems to be Solved by the Invention

A laminated glass formed with use of the interlayer film of Patent Document 1 has insufficient sound insulation for sound with a frequency of about 2000 Hz, and therefore may not prevent decrease in sound insulation when the coincidence effect occurs. Also, the sound insulation of the laminated glass is sometimes insufficient at around 20° C.

Here, the coincidence effect refers to a phenomenon in which, upon incidence of sound waves on a glass plate, transverse waves due to rigidity and inertia of the glass plate spread on the glass surface to resonate with the incidence sound, whereby the sound is transmitted.

In the case of forming a laminated glass with the multilayer interlayer film in which a sound insulation layer and other layers are laminated according to Patent Document 1, the sound insulation of the laminated glass at around 20° C. is increased to some extent. However, since the multilayer interlayer film includes the sound insulation layer, bubble formation may occur in the laminated glass formed with use of the multilayer interlayer film.

Meanwhile, considerations have been made in recent years to increase the amount of the plasticizer in an interlayer film for increasing the sound insulation of a laminated glass. Increasing the amount of the plasticizer can improve the sound insulation of the laminated glass. However, the increase in the amount of the plasticizer sometimes causes bubble formation in the laminated glass.

The present invention aims to provide an interlayer film for a laminated glass which can give a laminated glass capable of suppressing bubble formation and bubble growth; and a laminated glass using the interlayer film for a laminated glass.

Specifically, the present invention aims to provide an interlayer film for a laminated glass which can provide a laminated glass providing excellent sound insulation; and a laminated glass using the interlayer film for a laminated glass.

Means for Solving the Problems

A broad aspect of the present invention is an interlayer film for a laminated glass, including a first layer that contains a polyvinyl acetal resin and a plasticizer, and a second layer that contains a polyvinyl acetal resin and a plasticizer and is laminated on one face of the first layer, wherein an amount of the plasticizer for each 100 parts by weight of the polyvinyl acetal resin in the first layer is 50 parts by weight or higher, the hydroxyl content of the polyvinyl acetal resin in the first layer is lower than the hydroxyl content of the polyvinyl acetal resin in the second layer, the difference between the hydroxyl content of the polyvinyl acetal resin in the first layer and the hydroxyl content of the polyvinyl acetal resin in the second layer is at most 9.2 mol %, and the polyvinyl acetal resin in the first layer has a degree of acetylation of at most 8 mol % in the case that the difference between the hydroxyl content of the polyvinyl acetal resin in the first layer and the hydroxyl content of the polyvinyl acetal resin in the second layer is more than 8.5 mol % and at most 9.2 mol %.

In a specific aspect of the interlayer film for a laminated glass according to the present invention, the difference between the hydroxyl content of the polyvinyl acetal resin in the first layer and the hydroxyl content of the polyvinyl acetal resin in the second layer is at most 9.2 mol %, and the polyvinyl acetal resin in the first layer has a degree of acetylation of higher than 8 mol % in the case that the difference between the hydroxyl content of the polyvinyl acetal resin in the first layer and the hydroxyl content of the polyvinyl acetal resin in the second layer is at most 8.5 mol %.

In another specific aspect of the interlayer film for a laminated glass according to the present invention, the polyvinyl acetal resin in the first layer has a degree of acetylation of at most 8 mol % and a hydroxyl content of lower than 31.5 mol %.

In a yet another specific aspect of the interlayer film for a laminated glass according to the present invention, the polyvinyl acetal resin in the first layer has a degree of acetylation of at most 8 mol % and a degree of acetalization of 68 mol % or higher.

In a yet another specific aspect of the interlayer film for a laminated glass according to the present invention, the polyvinyl acetal resin in the first layer has a hydroxyl content of lower than 31.5 mol % and a degree of acetalization of 68 mol % or higher.

In a yet another specific aspect of the interlayer film for a laminated glass according to the present invention, the polyvinyl acetal resin in the first layer has a degree of acetylation of higher than 8 mol % and lower than 20 mol % in the case that the difference between the hydroxyl content of the polyvinyl acetal resin in the first layer and the hydroxyl content of the polyvinyl acetal resin in the second layer is at most 8.5 mol %.

In a yet another specific aspect of the interlayer film for a laminated glass according to the present invention, the polyvinyl acetal resin in the first layer has a degree of acetylation of higher than 8 mol % and a degree of acetalization of 52.5 mol % or higher in the case that the difference between the hydroxyl content of the polyvinyl acetal resin in the first layer and the hydroxyl content of the polyvinyl acetal resin in the second layer is at most 8.5 mol %.

In a yet another specific aspect of the interlayer film for a laminated glass according to the present invention, the polyvinyl acetal resin in the first layer has a degree of acetylation of higher than 8 mol % and a hydroxyl content of at most 28 mol % in the case that the difference between the hydroxyl content of the polyvinyl acetal resin in the first layer and the hydroxyl content of the polyvinyl acetal resin in the second layer is at most 8.5 mol %.

In a yet another specific aspect of the interlayer film for a laminated glass according to the present invention, the polyvinyl acetal resin in the first layer is a polyvinyl acetal resin which is obtained by acetalizing a polyvinyl alcohol having a degree of polymerization of higher than 1700 and at most 3000.

In a yet another specific aspect of the interlayer film for a laminated glass according to the present invention, the polyvinyl acetal resin in the second layer has a hydroxyl content of at most 33 mol %.

In a yet another specific aspect of the interlayer film for a laminated glass according to the present invention, an amount of the plasticizer for each 100 parts by weight of the polyvinyl acetal resin in the first layer is larger than an amount of the plasticizer for each 100 parts by weight of the polyvinyl acetal resin in the second layer.

In a yet another specific aspect of the interlayer film for a laminated glass according to the present invention, an amount of the plasticizer for each 100 parts by weight of the polyvinyl acetal resin in the first layer is larger by at least 20 parts by weight than an amount of the plasticizer for each 100 parts by weight of the polyvinyl acetal resin in the second layer.

In a yet another specific aspect of the interlayer film for a laminated glass according to the present invention, the difference between the hydroxyl content of the polyvinyl acetal resin in the first layer and the hydroxyl content of the polyvinyl acetal resin in the second layer is at most 8.5 mol %.

A yet another specific aspect of the interlayer film for a laminated glass according to the present invention further includes a third layer that contains a polyvinyl acetal resin and a plasticizer and is laminated on the other face of the first layer, and the hydroxyl content of the polyvinyl acetal resin in the first layer is lower than the hydroxyl content of the polyvinyl acetal resin in the third layer, the difference between the hydroxyl content of the polyvinyl acetal resin in the first layer and the hydroxyl content of the polyvinyl acetal resin in the third layer is at most 9.2 mol %, and the polyvinyl acetal resin in the first layer has a degree of acetylation of at most 8 mol % in the case that the difference between the hydroxyl content of the polyvinyl acetal resin in the first layer and the hydroxyl content of the polyvinyl acetal resin in the third layer is more than 8.5 mol % and at most 9.2 mol %.

In a yet another specific aspect of the interlayer film for a laminated glass according to the present invention, the difference between the hydroxyl content of the polyvinyl acetal resin in the first layer and the hydroxyl content of the polyvinyl acetal resin in the third layer is at most 9.2 mol %, and the polyvinyl acetal resin in the first layer has a degree of acetylation of higher than 8 mol % in the case that the difference between the hydroxyl content of the polyvinyl acetal resin in the first layer and the hydroxyl content of the polyvinyl acetal resin in the third layer is at most 8.5 mol %.

In a yet another specific aspect of the interlayer film for a laminated glass according to the present invention, the polyvinyl acetal resin in the first layer has a hydroxyl content of lower than 31.5 mol % and a degree of acetalization of 68 mol % or higher.

In a yet another specific aspect of the interlayer film for a laminated glass according to the present invention, the polyvinyl acetal resin in the third layer has a hydroxyl content of at most 33 mol %.

In a yet another specific aspect of the interlayer film for a laminated glass according to the present invention, an amount of the plasticizer for each 100 parts by weight of the polyvinyl acetal resin in the first layer is larger than an amount of the plasticizer for each 100 parts by weight of the polyvinyl acetal resin in each of the second layer and the third layer.

In a yet another specific aspect of the interlayer film for a laminated glass according to the present invention, the polyvinyl acetal resin in each of the first layer, the second layer and the third layer preferably includes a polyvinyl butyral resin. In the interlayer film for a laminated glass according to the present invention, the plasticizer in each of the first layer, the second layer and the third layer preferably includes triethylene glycol di-2-ethylhexanoate.

The laminated glass according to the present invention is a laminated glass including first laminated glass component and second laminated glass component, and an interlayer film sandwiched between the first laminated glass component and the second laminated glass component, wherein the interlayer film is the interlayer film for a laminated glass structured according to the present invention.

Effect of the Invention

According to the interlayer film for a laminated glass of the present invention, the hydroxyl content of the polyvinyl acetal resin in the first layer is lower than the hydroxyl content of the polyvinyl acetal resin in the second layer, an amount of the plasticizer for each 100 parts by weight of the polyvinyl acetal resin in the first layer is 50 parts by weight or higher, the difference between the hydroxyl content of the polyvinyl acetal resin in the first layer and the hydroxyl content of the polyvinyl acetal resin in the second layer is at most 9.2 mol %, and the polyvinyl acetal resin in the first layer has a degree of acetylation of at most 8 mol % in the case that the difference between the hydroxyl content of the polyvinyl acetal resin in the first layer and the hydroxyl content of the polyvinyl acetal resin in the second layer is more than 8.5 mol % and at most 9.2 mol %. Therefore, when the interlayer film for a laminated glass is used for forming a laminated glass, bubble formation and bubble growth can be suppressed in the laminated glass.

MODE(S) FOR CARRYING OUT THE INVENTION

Hereinafter, the present invention will be described by means of specific Embodiments and Examples of the present invention, with reference to the drawings.

Figure 1:
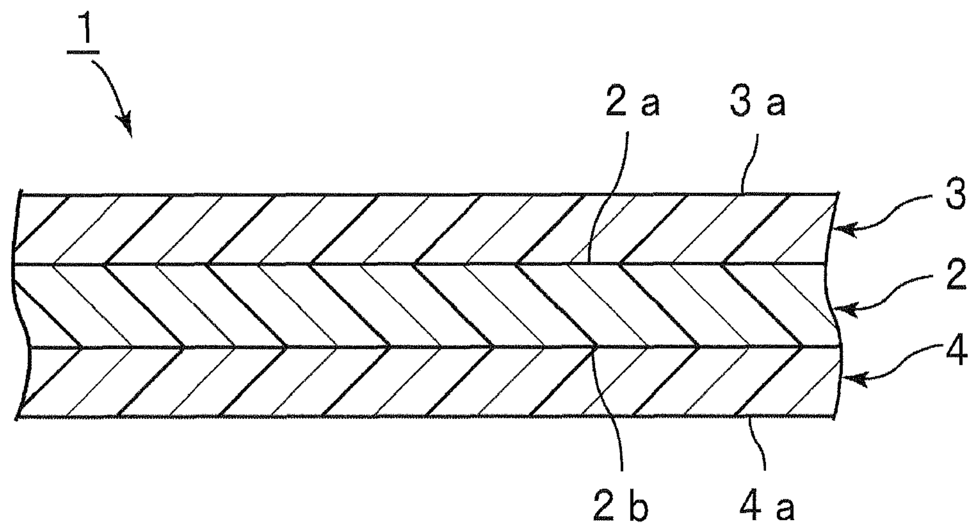
FIG. 1 is a cross-sectional view schematically illustrating an interlayer film for a laminated glass according to one embodiment of the present invention.

FIG. 1 is a cross-sectional view schematically illustrating an interlayer film for a laminated glass according to one embodiment of the present invention.

An interlayer film 1 illustrated in FIG. 1 is provided with a first layer 2, a second layer 3 laminated on one face 2*a* (first face) of the first layer 2, and a third layer 4 laminated on the other face 2*b* (second face) of the first layer 2. The interlayer film 1 is used for forming a laminated glass. The interlayer film 1 is an interlayer film for a laminated glass. The interlayer film 1 is a multilayer interlayer film.

In the present embodiment, the first layer 2 is an intermediate layer, and the second layer 3 and the third layer 4 are surface layers. Here, the second layer 3 and the third layer 4 may be intermediate layers, and an additional interlayer film for a laminated glass may be laminated on each of outer surface 3*a* of the second layer 3 and outer surface 4*a* of the third layer 4.

Each of the first layer 2, the second layer 3 and the third layer 4 contains a polyvinyl acetal resin and a plasticizer.

The main feature of the present embodiment is that the hydroxyl content of the polyvinyl acetal resin in the first layer 2 is lower than the hydroxyl content of the polyvinyl acetal resin in the second layer 3, the difference between the hydroxyl content of the polyvinyl acetal resin in the first layer 2 and the hydroxyl content of the polyvinyl acetal resin in the second layer 3 (hereinafter, also referred to as difference (1-2) of the contents) is at most 9.2 mol %, and moreover, the polyvinyl acetal resin in the first layer 2 has a degree of acetylation of at most 8 mol % in the case that the difference (difference (1-2) of the contents) between the hydroxyl content of the polyvinyl acetal resin in the first layer 2 and the hydroxyl content of the polyvinyl acetal resin in the second layer 3 is more than 8.5 mol % and at most 9.2 mol %. Also, in the present embodiment, an amount of the plasticizer for each 100 parts by weight of the polyvinyl acetal resin in the first layer 2 is 50 parts by weight or higher. The difference (1-2) of the contents may be higher than 8.5 mol % and at most 9.2 mol %, and further may be at most 8.5 mol %.

In the present embodiment, the hydroxyl content of the polyvinyl acetal resin in the first layer 2 is lower than the hydroxyl content of the polyvinyl acetal resin in the third layer 4, the difference between the hydroxyl content of the polyvinyl acetal resin in the first layer 2 and the hydroxyl content of the polyvinyl acetal resin in the third layer 4 (hereinafter, also referred to as difference (1-3) of the contents) is at most 9.2 mol %, and moreover, the polyvinyl acetal resin in the first layer 2 preferably has a degree of acetylation of at most 8 mol % in the case that the difference (difference (1-3) of the contents) between the hydroxyl content of the polyvinyl acetal resin in the first layer 2 and the hydroxyl content of the polyvinyl acetal resin in the third layer 4 is more than 8.5 mol % and at most 9.2 mol %. Meanwhile, even if the difference (1-3) of the contents is at most 8.5 mol %, in the case that the difference (1-2) of the contents is 8.5 mol % or higher and at most 9.2 mol %, a degree of acetylation of the polyvinyl acetal resin in the first layer 2 is at most 8 mol %. The difference (1-3) of the contents may be higher than 8.5 mol % and at most 9.2 mol %, and further may be at most 8.5 mol %.

Meanwhile, the reason why the degree of acetylation of the vinyl acetal resin in the first layer 2 is limited to at most 8 mol % in the case that each of the difference (1-2) of the contents and the difference (1-3) of the contents is higher than 8.5 mol % and at most 9.2 mol % is that, if the degree of acetylation of the polyvinyl acetal resin in the first layer 2 is increased along with the increase of the difference (1-2) of the contents and the difference (1-3) of the contents, the effect of suppressing the bubble formation and bubble growth in the laminated glass tends to decrease. In the case that the difference (1-2) of the contents and the difference (1-3) of the contents each are at most 8.5 mol %, even if the degree of acetylation of the polyvinyl acetal resin in the first layer 2 is higher than 8 mol %, bubble formation and bubble growth in the laminated glass can be suppressed.

The present inventors have found that the plasticizer migrates between the layers in a multilayer interlayer film for a laminated glass, and as a result, a layer containing a large amount of the plasticizer is formed; for example, the plasticizer migrates from the second layer and the third layer to the first layer, and the first layer turns out to contain a large amount of the plasticizer. The present inventors have also found that, formation of a layer containing a large amount of the plasticizer, i.e., a large amount of the plasticizer in the first layer, may easily cause bubble formation in a laminated layer including the interlayer film for a laminated glass, and once bubbles are generated, the bubbles may grow with the generated bubbles as the core.

The present inventors have made various studies to suppress bubble formation and bubble growth, and have found that the bubble formation and bubble growth in a laminated glass can be sufficiently suppressed if the hydroxyl content of the polyvinyl acetal resin in each of the first layer, the second layer and the third layer is controlled as mentioned earlier. Since migration of the plasticizer can be inhibited, and also bubble formation and bubble growth in the laminated glass can be sufficiently suppressed, the amount of the plasticizer in each layer, especially the amount of the plasticizer in the first layer 2 can be increased. As a result, the sound insulation of the laminated glass can be enhanced.

In terms of further suppressing bubble formation and bubble growth in the laminated glass, the minimum difference between the hydroxyl content of the polyvinyl acetal resin in the first layer 2 and the hydroxyl content of the polyvinyl acetal resin in each of the second layer 3 and the third layer 4 (difference (1-2) of the contents and difference (1-3) of the contents is preferably 0.1 mol %, more preferably 1 mol %, and still more preferably 2 mol %. The maximum difference is preferably 8.5 mol %, more preferably 7.8 mol %, still more preferably 7 mol %, and particularly preferably 5.6 mol %. The difference between the hydroxyl content of the polyvinyl acetal resin in the first layer 2 and the hydroxyl content of the polyvinyl acetal resin in each of the second layer 3 and the third layer 4 (difference (1-2) of the contents and difference (1-3) of the contents) is preferably at most 5 mol %, more preferably at most 4.5 mol %, still more preferably at most 4 mol %, and further preferably at most 3.5 mol % because bubble formation and bubble growth in the laminated glass can be further suppressed.

If the first layer 2 has 55 parts by weight or more of the plasticizer for each 100 parts by weight of the polyvinyl acetal resin, the sound insulation of the laminated glass can be sufficiently increased. If the first layer 2 has 60 parts by weight or more of the plasticizer for each 100 parts by weight of the polyvinyl acetal resin, the sound insulation of the laminated glass can be further enhanced.

Hereinafter, components contained in each of the first layer, the second layer and the third layer in the interlayer film 1 will be described in detail.

(Polyvinyl Acetal Resin)

In the case that each of the first layer 2, the second layer 3 and the third layer 4 in the interlayer film 1 contains a polyvinyl acetal resin and a plasticizer, the first layer 2, the second layer 3 and the third layer 4 can be provided with a higher adhesion. As a result, the interlayer film 1 can provide even higher adhesion to the laminated glass components.

The polyvinyl acetal resin can be produced by, for example, acetalizing a polyvinyl alcohol with an aldehyde. The polyvinyl alcohol can be obtained by, for example, saponifying a polyvinyl acetate. The saponification value of the polyvinyl alcohol is generally in the range of 70 to 99.9 mol %, and preferably in the range of 80 to 99.8 mol %.

The degree of polymerization of the polyvinyl alcohol is preferably 200 or higher, more preferably 500 or higher, still more preferably at most 3000, and further preferably at most 2800. If the degree of polymerization satisfies the preferable lower limit, the penetration resistance of the laminated glass can be further increased. If the degree of polymerization satisfies the preferable upper limit, the interlayer film can be easily molded. The polyvinyl acetal resin in the first layer is preferably a polyvinyl acetal resin obtained by acetalizing a polyvinyl alcohol with a degree of polymerization of higher than 1700 and at most 3000. The degree of polymerization means an average degree of polymerization.

The average degree of polymerization of the polyvinyl alcohol is determined by a method based on JIS K6726 "Testing Methods for Polyvinyl alcohol".

The aldehyde is not particularly limited. Generally, a C1 to C10 aldehyde is suitably used as the above aldehyde. Examples of the C1 to C10 aldehyde include propionaldehyde, n-butyraldehyde, isobutyraldehyde, N-valeraldehyde, 2-ethylbutyraldehyde, n-hexyl aldehyde, n-octyl aldehyde, n-nonyl aldehyde, n-decyl aldehyde, formaldehyde, acetaldehyde, and benzaldehyde. Particularly, n-butyraldehyde, n-hexyl aldehyde, and n-valeraldehyde are preferable, and n-butyraldehyde is more preferable. Each of the above aldehydes may be used alone, or two or more of the aldehydes may be used in combination.

The polyvinyl acetal resin is preferably a polyvinyl butyral resin. The polyvinyl acetal resin in each of the first layer, the second layer and the third layer of the interlayer film for a laminated glass according to the present invention preferably includes a polyvinyl butyral resin. A polyvinyl butyral resin can be easily synthesized. Use of a polyvinyl butyral resin contributes to even more appropriate adhesion of the interlayer film 1 to the laminated glass components. Further, the use leads to a further increase in the properties such as light resistance and weatherability.

The minimum hydroxyl content (the amount of the hydroxyl group) of the polyvinyl acetal resin in the first layer 2, which is an intermediate layer, is preferably 20 mol %, more preferably 22 mol %, still more preferably 23 mol %, and particularly preferably 25 mol %. The maximum hydroxyl content is preferably 30 mol %, more preferably 28 mol %, still more preferably 27 mol %, and particularly preferably 26 mol %. If the hydroxyl content satisfies the preferable minimum amount, the first layer 2 can provide even higher adhesion. If the hydroxyl content satisfies the preferable maximum amount, the laminated glass can provide even higher sound insulation. Further, the interlayer film 1 can have higher flexibility, and can therefore show even higher handling properties.

If the hydroxyl content of the polyvinyl acetal resin is low, the hydrophilicity of the polyvinyl acetal resin is low. Hence, the amount of the plasticizer used can be increased and, as a result, the sound insulation of the laminated glass can be further increased. If the hydroxyl content of the polyvinyl acetal resin in the first layer 2 is lower than the hydroxyl content of the polyvinyl acetal resin in each of the second layer 3 and the third layer 4, the amount of the plasticizer in the first layer 2 can be increased.

The minimum hydroxyl content of the polyvinyl acetal resin in each of the second layer 3 and the third layer 4, which are surface layers, is preferably 26 mol %, more preferably 27 mol %, still more preferably 28 mol %, and particularly preferably 29 mol %. The maximum hydroxyl content is preferably 35 mol %, more preferably 33 mol %, still more preferably 32 mol %, and most preferably 31.5 mol %. If the hydroxyl content satisfies the preferable minimum value, the interlayer film 1 can provide even higher adhesion. Further, if the hydroxyl content satisfies the preferable maximum value, the interlayer film 1 can have higher flexibility, and can therefore show even higher handling properties.

The hydroxyl content of the polyvinyl acetal resin is a value of the molar fraction in percentage (mol %) determined by dividing the amount of ethylene group having the hydroxyl group bonded thereto by the total amount of the ethylene group in the main chain. The amount of ethylene group having the hydroxyl group bonded thereto can be determined by, for example, determining the amount of ethylene group having the hydroxyl group bonded thereto in the polyvinyl acetal resin according to the method based on JIS K6728 "Testing Methods for Polyvinyl butyral".

The degree of acetylation (the amount of acetyl groups) of the polyvinyl acetal resin in the first layer 2 is preferably at most 30 mol %. If the degree of acetylation exceeds 30 mol %, the reaction efficiency in production of a polyvinyl acetal resin may decrease.

The lowest degree of acetylation of the polyvinyl acetal resin in the first layer 2 is preferably 0.1 mol %, more preferably 0.5 mol %, still more preferably 1 mol %, and particularly preferably 1.2 mol %. The highest degree is preferably 24 mol %, more preferably 20 mol %, still more preferably 16 mol %, and particularly preferably 15 mol %. The lowest degree of acetylation of the polyvinyl acetal resin in each of the second layer 3 and the third layer 4 is preferably 0.1 mol %, more preferably 0.5 mol %, and still more preferably 0.8 mol %. The highest degree is preferably 10 mol %, more preferably 5 mol %, still more preferably 2 mol %, and particularly preferably 1.5 mol %. If the degree of acetylation satisfies the preferable lowest degree, the compatibility of the polyvinyl acetal resin and the plasticizer is further increased, and the glass-transition temperature of the interlayer film can be sufficiently decreased. If the degree of acetylation satisfies the preferable highest degree, the humidity resistance of the interlayer film can be further increased.

In terms of further enhancing the sound insulation of the laminated glass, the degree of acetylation of the polyvinyl acetal resin contained in the first layer 2 is preferably larger than the degree of acetylation of the polyvinyl acetal resin contained in each of the second layer 3 and the third layer 4.

The degree of acetylation is a value of the molar fraction in percentage (mol %) determined by dividing, by the total amount of ethylene group in the main chain, a value resulting from subtracting the amount of ethylene group having the acetal group bonded thereto and the amount of ethylene group having the hydroxyl group bonded thereto from the total amount of ethylene group in the main chain. The amount of ethylene group having the acetal group bonded thereto can be determined based on JIS K6728 "Testing Methods for Polyvinyl butyral", for example.

The lowest degree of acetalization of the polyvinyl acetal resin in the first layer 2 is preferably 45 mol %, more preferably 52.5 mol %, still more preferably 58 mol %, and particularly preferably 60 mol %. The highest degree is preferably 85 mol %, more preferably 80 mol %, still more preferably 77 mol %, and particularly preferably 75 mol %. The lowest degree of acetalization of the polyvinyl acetal resin in each of the second layer 3 and the third layer 4 is preferably 61 mol %, more preferably 65 mol %, and still more preferably 67 mol %. The highest degree is preferably 72 mol %, more preferably 71 mol %, and still more preferably 70 mol %. If the degree of acetalization satisfies the preferable lowest degree, the compatibility of the polyvinyl acetal resin and the plasticizer can be further increased, and also the glass-transition temperature of the interlayer film can be sufficiently decreased. If the degree of acetalization satisfies the preferable highest degree, the reaction time required to produce a polyvinyl acetal resin can be shortened.

The degree of acetalization is a value of the molar fraction in percentage (mol %) determined by dividing the amount of ethylene group having the acetal group bonded thereto by the total amount of ethylene group in the main chain.

The degree of acetalization is calculated by first measuring the amounts of the acetyl group and the vinyl alcohol (hydroxyl content) based on JIS K6728 "Testing Methods for Polyvinyl butyral", calculating the molar fraction from the measured amounts, and subtracting the amounts of acetyl and vinyl alcohol from 100 mol %.

By controlling the hydroxyl content of each of the first layer, the second layer and the third layer as mentioned earlier for suppressing the bubble formation and bubble growth, bubble formation and bubble growth in the interlayer film can be sufficiently suppressed. As migration of the plasticizer can be inhibited, bubble formation and bubble growth in the laminated glass can be sufficiently suppressed, and also an increased sound insulation of the laminated glass can be achieved.

In the case that the difference (1-2) of the contents is at most 8.5 mol %, the degree of acetylation of the polyvinyl acetal resin in the first layer is preferably higher than 8 mol % because migration of the plasticizer can be easily controlled and the sound insulation of the laminated glass can be further increased. In the case that the difference (1-3) of the contents is at most 8.5 mol %, the degree of acetylation of the polyvinyl acetal resin in the first layer is preferably higher than 8 mol % because migration of the plasticizer can be easily controlled and the sound insulation of the laminated glass can be further increased.

In the case that the difference (1-2) of the contents is higher than 8.5 mol % and at most 9.2 mol % or the case that the difference (1-2) of the contents is at most 9.2 mol %, the degree of acetalization of the polyvinyl acetal resin in the first layer is preferably 68 mol % or higher, or the hydroxyl content is lower than 31.5 mol % because migration of the plasticizer can be easily controlled and the sound insulation of the laminated glass can be further increased. In the case that the difference (1-3) of the contents is higher than 8.5 mol % and at most 9.2 mol % or the case that the difference (1-3) of the contents is at most 9.2 mol %, the degree of acetalization of the polyvinyl acetal resin in the first layer is preferably 68 mol % or higher, or the hydroxyl content is lower than 31.5 mol % because migration of the plasticizer can be easily controlled and the sound insulation of the laminated glass can be further increased.

Further, in the case that the degree of acetylation of the polyvinyl acetal resin in the first layer is at most 8 mol % (hereinafter, also referred to as "polyvinyl acetal resin A"), the difference (1-2) of the contents and the difference (1-3) of the contents each are at most 9.2 mol % because migration of the plasticizer can be easily controlled and the sound insulation of the laminated glass can be further increased. In the case that the degree of acetylation of the polyvinyl acetal resin in the first layer is higher than 8 mol % (hereinafter, also referred to as "polyvinyl acetal resin B"), the difference (1-2) of the contents and the difference (1-3) of the contents each are at most 9.2 mol %, and preferably at most 8.5 mol %.

The highest degree a of acetylation of the polyvinyl acetal resin A is preferably 8 mol %, more preferably 7 mol %, still more preferably 6 mol %, and further preferably 5 mol %. The lowest degree is preferably 0.1 mol %, more preferably 0.5 mol %, still more preferably 0.8 mol %, and particularly preferably 1 mol %. If the degree a of acetylation is at most the highest degree and at least the lowest degree, migration of the plasticizer can be easily controlled, and the sound insulation of the laminated glass can be further increased.

The lowest degree a of acetalization of the polyvinyl acetal resin A is preferably 68 mol %, more preferably 70 mol %, still more preferably 71 mol %, and particularly preferably 72 mol %. The highest degree is preferably 85 mol %, more preferably 83 mol %, still more preferably 81 mol %, and particularly preferably 79 mol %. If the degree a of acetalization is the lowest degree or higher, the sound insulation of the laminated glass can be further increased. If the degree a of acetalization is at most the highest degree, the reaction time required to produce a polyvinyl acetal resin A can be shortened.

A hydroxyl content a of the polyvinyl acetal resin A is preferably lower than 31.5 mol %, more preferably at most 31 mol %, still more preferably at most 29 mol %, and further preferably at most 28 mol %. The hydroxyl content a is preferably at least 20 mol %, more preferably at least 21 mol %, still more preferably at least 22 mol %, and particularly preferably at least 24 mol %. If the hydroxyl content a is at most the highest degree, the sound insulation of the laminated glass can be further increased. If the hydroxyl content a is at least the lowest degree, the adhesion of the interlayer film can be further increased.

The polyvinyl acetal resin A is preferably a polyvinyl butyral resin.

The degree b of acetylation of the polyvinyl acetal resin B is higher than 8 mol %, and the lowest degree thereof is preferably 10 mol %, more preferably 11 mol %, still more preferably 12 mol %, and particularly preferably 15 mol %. The highest value is preferably 30 mol %, more preferably 28 mol %, still more preferably 26 mol %, and particularly preferably 19.5 mol %. If the degree b of acetylation is at least the lowest degree, the sound insulation of the laminated glass can be further increased. If the degree b of acetylation is at most the highest degree, the reaction time required to produce the polyvinyl acetal resin B can be shortened. The degree b of acetylation of the polyvinyl acetal resin B is preferably lower than 20 mol % because the reaction time required for producing the polyvinyl acetal resin B can be shortened. The degree b of acetylation of the polyvinyl acetal resin B is preferably at most 25 mol % because bubble formation and bubble growth in the laminated glass can be further suppressed.

The lowest degree b of acetalization of the polyvinyl acetal resin B is 45 mol %, more preferably 52.5 mol %, still more preferably 55 mol %, and particularly preferably 60 mol %. The highest degree is preferably 80 mol %, more preferably 77 mol %, still more preferably 74 mol %, and particularly preferably 71 mol %. If the degree b of acetalization is at least the lowest degree, the sound insulation of the laminated glass can be further increased. If the degree b of acetalization is at most the highest degree, the reaction time required to produce the polyvinyl acetal resin B can be shortened.

The highest degree of hydroxyl content b of the polyvinyl acetal resin B is preferably 31.5 mol %, more preferably 30 mol %, still more preferably 29 mol %, and particularly preferably 27.5 mol %. The lowest degree is preferably 22 mol %, more preferably 23 mol %, still more preferably 24 mol %, and particularly preferably 25 mol %. If the hydroxyl content b is at most the highest value, the sound insulation of the laminated glass can be further increased. If the hydroxyl content b is at least the lowest value, the adhesion of the interlayer film can be further increased.

In the case that the difference (1-2) of the contents or the difference (1-3) of the contents is higher than 8.5 mol % and at most 9.2 mol %, the degree of acetylation of the polyvinyl acetal resin in the first layer is at most 8 mol %.

In the case that the difference (1-2) of the contents or the difference (1-3) of the contents is at most 8.5 mol %, most preferably the degree of acetylation of the polyvinyl acetal resin in the first layer is higher than 8 mol %. For the polyvinyl acetal resin in the first layer, most preferably, the degree of acetylation is at most 8 mol % and the hydroxyl content is lower than 31.5 mol %; second preferably, the degree of acetylation is at most 8 mol % and the degree of acetalization is 68 mol % or higher; and third preferably, the hydroxyl content is lower than 31.5 mol % and the degree of acetalization is 68 mol % or higher.

In the case that the difference (1-2) of the contents or the difference (1-3) of the contents is at most 8.5 mol %, for the polyvinyl acetal resin in the first layer, most preferably, the degree of acetylation is higher than 8 mol % and lower than 20 mol %; second preferably, the degree of acetylation is higher than 8 mol % and the degree of acetalization is 52.5 mol % or higher; and third preferably, the degree of acetylation is higher than 8 mol % and the hydroxyl content is at most 28 mol %.

In the case that the interlayer film for a laminated glass of the present invention is provided with the first layer, the second layer and the third layer, preferably, the polyvinyl acetal resin in the first layer has a hydroxyl content of lower than 31.5 mol % and a degree of acetylation of 68 mol % or higher. Preferably, the hydroxyl content of the polyvinyl acetal resin in each of the second layer and the third layer is at most 33 mol %.

The polyvinyl acetal resin B is preferably a polyvinyl butyral resin.

The polyvinyl acetal resin A and the polyvinyl acetal resin B each are obtained by acetalizing a polyvinyl alcohol with an aldehyde. The aldehyde is preferably a C1 to C10 aldehyde, and is more preferably a C4 or C5 aldehyde. The polyvinyl acetal resin A and the polyvinyl acetal resin B each are preferably a polyvinyl acetal resin which can be obtained by acetalizing with an aldehyde a polyvinyl alcohol having a degree of polymerization of higher than 1700 and at most 3000. The lowest degree of polymerization of the polyvinyl alcohol is preferably 1800, more preferably 2000, still more preferably 2400, and particularly preferably 2500. The highest degree is preferably 3000, more preferably 2900, still more preferably 2800, and particularly preferably 2700. If the degree of polymerization satisfies the lowest degree, the penetration resistance of the laminated glass can be further increased, and also bubble formation and bubble growth in the laminated glass can be further suppressed. If the degree of polymerization satisfies the preferable highest degree, the interlayer film can be easily molded.

(Plasticizer)

The plasticizer in each of the first layer 2, the second layer 3 and the third layer 4 is not particularly limited. The plasticizer may be a publicly known plasticizer. One plasticizer may be used or two or more plasticizers may be used in combination as the above plasticizer.

Examples of the plasticizer include organic ester plasticizers such as a monobasic organic acid ester and a polybasic organic acid ester, and phosphorus plasticizers such as an organic phosphorus acid plasticizer and an organic phosphorous acid plasticizer. Among these, an organic ester plasticizer is preferable. The plasticizer is preferably a liquid plasticizer.

Examples of the monobasic organic acid ester include, but not particularly limited to, a glycol ester obtained through the reaction of glycol and a monobasic organic acid, and an ester of a monobasic organic acid and triethylene glycol or tripropylene glycol. Examples of the glycol include triethylene glycol, tetraethylene glycol, and tripropylene glycol. Examples of the monobasic organic acid include butanoic acid, isobutyric acid, caproic acid, 2-ethylbutanoic acid, heptylic acid, n-octyl acid, 2-ethylhexyl acid, n-nonylic acid, and decylic acid.

Examples of the polybasic organic acid ester include, but not particularly limited to, ester compounds such as one of a polybasic organic acid and a C4 to C8 straight or branched chain alcohol. Examples of the polybasic organic acid include adipic acid, sebacic acid, and azelaic acid.

Examples of the organic ester plasticizer include, but not particularly limited to, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctylazelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, a mixture of heptyl adipate and nonyl adipate, diisononyl adipate, diisodecyl adipate, heptyl nonyl adipate, dibutyl sebacate, oil-modified alkyd sebacate, and a mixture of phosphate and adipate. An organic ester plasticizer other than these may be used. Adipates other than the above adipate may be used.

Examples of the organic phosphoric acid plasticizer include, but not particularly limited to, tributoxyethyl phosphate, isodecyl phenyl phosphate, and triisopropyl phosphate.

The plasticizer is preferably a diester plasticizer represented by the following formula (1). The use of a diester plasticizer can further increase the sound insulation of the laminated glass.

[Chem. 1]

formula(1)

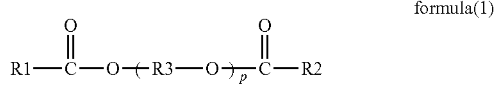

In formula (1), R1 and R2 each represent a C5 to C10 organic group, R3 represents an ethylene group, an isopropylene group, or an n-propylene group, and p represents an integer of 3 to 10. R1 and R2 in formula (1) each preferably represent a C6 to C10 organic group.

The plasticizer preferably contains a diester compound, more preferably contains at least one compound selected from the group consisting of triethylene glycol di-2-ethylbutyrate (3 GH), triethylene glycol di-2-ethylhexanoate (3GO) and triethylene glycol di-n-heptanoate (3G7), and still more preferably contains triethylene glycol di-2-ethylhexanoate. Use of these preferable plasticizers can further increase the sound insulation of the laminated glass. The plasticizer in each of the first layer, the second layer and the third layer of the interlayer film for a laminated glass according to the present invention particularly preferably includes triethylene glycol di-2-ethylhexanoate.

The amount of the plasticizer in each layer of the interlayer film 1 is not particularly limited.

In terms of sufficiently increasing the sound insulation of the laminated glass, the amount of the plasticizer for each 100 parts by weight of the polyvinyl acetal resin in the first layer 2 is 50 parts by weight or more. If a large amount of the plasticizer is contained in the first layer 2, since the hydroxyl content in each of the first layer 2, the second layer 3 and the third layer 4 is controlled as mentioned earlier, bubble formation and bubble growth can be suppressed.

The minimum amount of the plasticizer for each 100 parts by weight of the polyvinyl acetal resin in the first layer 2 is 50 parts by weight, preferably 55 parts by weight, and more preferably 60 parts by weight. The maximum amount is preferably 80 parts by weight, more preferably 75 parts by weight, and still more preferably 70 parts by weight. If the amount of the plasticizer satisfies the preferable minimum amount, the penetration resistance of the laminated glass can be further increased. A larger amount of the plasticizer in the first layer 2 leads to even higher sound insulation of the laminated glass. If the amount of the plasticizer satisfies the preferable maximum amount, the transparency of the interlayer film can be further enhanced. The amount of the plasticizer for each 100 parts by weight of the polyvinyl acetal resin in the first layer 2 that can sufficiently increase the sound insulation of the laminated glass is 50 parts by weight or higher. The amount of the plasticizer for each 100 parts by weight of the polyvinyl acetal resin in the first layer 2 that can sufficiently increase the sound insulation of the laminated glass is 50 parts by weight or higher. Meanwhile, the amount of the plasticizer for each 100 parts by weight of the polyvinyl acetal resin in the first layer 2 is 50 part by weight or more preferably before migration (initial stage) of the plasticizer and may also be 50 parts by weight or more after the migration. In the case of blending 50 parts by weight of the plasticizer for each 100 parts by weight of the polyvinyl acetal resin to obtain the first layer 2, the amount of the plasticizer in the first layer 2 generally tends to be high. In particular, if the hydroxyl content of the polyvinyl acetal resin in the first layer 2 is low, in the case of blending 50 parts by weight of the plasticizer for each 100 parts by weight of the polyvinyl acetal resin to obtain the first layer 2, the amount of the plasticizer in the first layer 2 generally tends to be high.

The minimum amount of the plasticizer for each 100 parts by weight of the polyvinyl acetal resin in each of the second layer 3 and the third layer 4 is preferably 25 parts by weight, more preferably 30 parts by weight, and still more preferably 35 parts by weight. The maximum amount is preferably 50 parts by weight, more preferably 45 parts by weight, and still more preferably 40 parts by weight. If the amount of the plasticizer satisfies the preferable minimum amount, the adhesion of the interlayer film is increased, which leads to a further increase in the penetration resistance of the laminated glass. If the amount of the plasticizer satisfies the preferable maximum amount, the transparency of the interlayer film can be further increased.

In terms of further increasing the sound insulation of the laminated glass, the amount of the plasticizer for each 100 parts by weight of the polyvinyl acetal resin in the first layer 2 is preferably larger than the amount of the plasticizer for each 100 parts by weight of the polyvinyl acetal resin in each of the second layer 3 and the third layer 4. In terms of further increasing the sound insulation of the laminated glass, the amount of the plasticizer for each 100 parts by weight of the polyvinyl acetal resin in the first layer 2 is larger than the amount of the plasticizer for each 100 parts by weight of the polyvinyl acetal resin in each of the second layer 3 and the third layer 4 by preferably 5 parts by weight or more, more preferably 10 parts by weight or more, still more preferably 15 parts by weight or more, further preferably 20 parts by weight or more, particularly preferably 25 parts by weight or more, and most preferably 30 parts by weight or more.

(Other Components)

The first layer 2, the second layer 3 and the third layer 4 of the interlayer film 1 each may contain, if desired, additives such as an ultraviolet ray absorbent, an antioxidant, a light stabilizer, a flame retardant, an antistatic agent, a pigment, a dye, an adhesion regulator, a moisture resistant agent, a fluorescent bleach, and an infrared absorbent.

(Laminated Glass)

Each interlayer film for a laminated glass according to the present invention is used to obtain a laminated glass.

Figure 2:
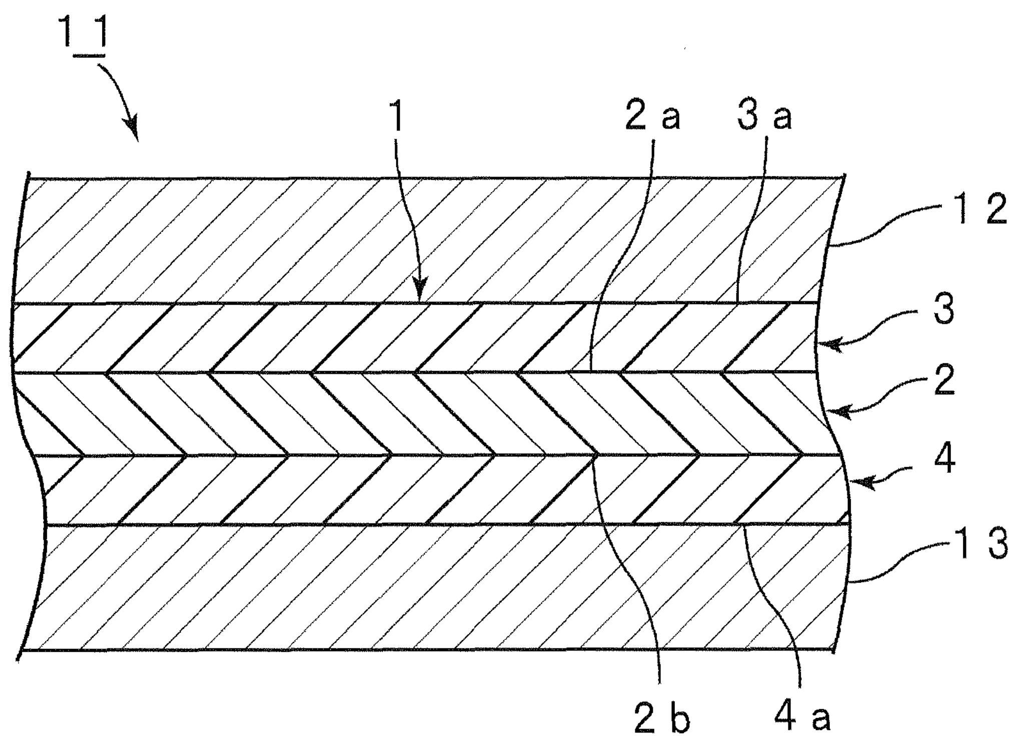
FIG. 2 is a cross-sectional view schematically illustrating one example of a laminated glass including the interlayer film for a laminated glass illustrated in FIG. 1.

FIG. 2 is a cross-sectional view schematically illustrating one example of a laminated glass using the interlayer film 1 in FIG. 1.

A laminated glass 11 in FIG. 2 is provided with a first laminated glass component 12, a second laminated glass component 13, and the interlayer film 1. The interlayer film 1 is sandwiched between the first laminated glass component 12 and second laminated glass component 13.

The first laminated glass component 12 is laminated on an outer surface 3*a* of the second layer 3. The second laminated glass component 13 is laminated on an outer surface 4*a* of the third layer 4. Therefore, the laminated glass 11 has a structure in which the first laminated glass component 12, the second layer 3, the first layer 2, the third layer 4, and the second laminated glass component 13 are laminated in the stated order.

Examples of the first laminated glass component 12 and second laminated glass component 13 include glass plates and PET (polyethylene terephthalate) films. The laminated glass encompasses not only a laminated glass having an interlayer film sandwiched between two glass plates but also a laminated glass having an interlayer film sandwiched between a glass plate and a PET film. A laminated glass is a laminated product provided with glass plate(s) preferably including at least one glass plate.

Examples of the glass plate include inorganic glass and organic glass. Examples of the inorganic glass include float plate glass, heat absorbing plate glass, heat reflecting glass, polished plate glass, molded plate glass, wire plate glass, and lined plate glass. The organic glass is a synthetic resin glass substituted for inorganic glass. Examples of the organic glass include polycarbonate plates and poly(meth)acrylic resin plates. Examples of the poly(meth)acrylic resin plate include polymethyl (meth)acrylate plates.

In terms of further increasing the penetration resistance of the laminated glass 11, the lower limit of the thickness of the interlayer film 1 is preferably 0.05 mm, and more preferably 0.25 mm. The upper limit of the thickness is preferably 3 mm, and more preferably 1.5 mm. If the thickness of the interlayer film 1 satisfies the preferable lower limit and the preferable upper limit, the penetration resistance and the transparency of the laminated glass can be further increased.

The thickness of each of the first laminated glass component 12 and second laminated glass component 13 is preferably 0.5 mm or larger, and more preferably 1 mm or larger. The thickness is also preferably 5 mm or smaller, and more preferably 3 mm or smaller. If the laminated glass components 12 and 13 each are glass plates, the thickness of each glass plate is preferably within the range of 1 to 3 mm. If the laminated glass components 12 and 13 each are PET films, the thickness of each PET film is preferably within the range of 0.03 to 0.5 mm.

The method of producing the laminated glass 11 is not particularly limited. For example, sandwiching the interlayer film 1 between the first laminated glass component 12 and second laminated glass component 13, and then removing the air remaining between the interlayer film 1 and the first laminated glass component 12 and second laminated glass component 13 by pressing the resulting product with pressure rollers, or by putting the product in a rubber bag for vacuum-sucking. Then, the product is pre-bonded at about 70° C. to 110° C. to obtain a laminate. Next, the laminate is put into an autoclave or is pressed, so as to be pressure-bonded with a pressure of 1 to 1.5 MPa at about 120° C. to 150° C. Thus, the laminated glass 11 can be obtained.

The laminated glass 11 can be widely used for cars, rail cars, aircrafts, boats and ships, buildings, and the like. The laminated glass can be used in applications other than these uses. For example, the laminated glass 11 can be used for windshields, side glass, rear glass, and roof glass of cars.

Hereinafter, the present invention will be described in more detail based on Examples. The present invention is not limited to these Examples.

EXAMPLE 1

(1) Production of Multilayer Interlayer Film

To 100 parts by weight of polyvinyl butyral resin A (hydroxyl content: 25.2 mol %, degree of acetylation: 12.3 mol %, degree of butyralization: 62.5 mol %) was added 60 parts by weight of a plasticizer of triethylene glycol di-2-ethylhexanoate (3GO). The mixture was sufficiently kneaded by a mixing roll, so that a resin composition for an intermediate layer was obtained. Next, to 100 parts by weight of polyvinyl butyral resin B (hydroxyl content: 31.2 mol %, degree of acetylation: 0.8 mol %, degree of butyralization: 68.0 mol %) was added 37.5 parts by weight of a plasticizer of triethylene glycol di-2-ethylhexanoate (3GO). The mixture was sufficiently kneaded by a mixing roll, so that a resin composition for a surface layer was obtained.

The resin composition for an intermediate layer and the resin compositions for a surface layer were co-extruded, whereby a multilayer interlayer film in which a surface layer (thickness: 350 μm), an intermediate layer (thickness: 100 μm), and a surface layer (thickness: 350 μm) were laminated in the stated order was produced.

(2) Production of Laminated Glass for Penetration Resistance Test and Optical Distortion Evaluation The obtained multilayer interlayer film was cut into a size of 30 cm (length)×30 cm (width). Next, the multilayer interlayer film was sandwiched between two sheets of transparent float glass (30 cm (length)×30 cm (width)×2.5 mm (thickness)), and thereby a laminate was obtained. The laminate was put into a rubber bag and deaerated for 20 minutes at the degree of vacuum of 2.6 kPa. The deaerated product was put into an oven to further stand at 90° C. for 30 minutes for vacuum-pressing, so that the laminate was pressure-bonded in advance. The preliminary pressure-bonded laminate was pressure-bonded in an autoclave at 135° C. and a pressure of 1.2 MPa for 20 minutes. Thereby, a laminated glass to be used for a penetration resistance test and optical distortion evaluation was prepared.

(3) Production of Laminated Glass for Sound Insulation Measurement

A laminated glass to be used for sound insulation measurement was produced by the same procedure as that for preparing the laminated glass for a penetration resistance test, except that the multilayer interlayer film was cut into a size of 30 cm (length)×2.5 cm (width) and each sheet of the transparent float glass used had a size of 30 cm (length)×2.5 cm (width)×2.5 mm (thickness).

(4) Production of Laminated Glass for Bubble Formation Tests A and B

The obtained multilayer interlayer film was cut into a size of 30 cm (length)×15 cm (width), and the cut-out film was left to stand at 23° C. for 10 hours. Here, both faces of the obtained multilayer interlayer film were embossed with the ten-point average roughness of 30 μm. In the cut-out multilayer interlayer film, four 6 mm-diameter through holes were formed on respective four intersection points each located at a distance of 8 cm inward in the lengthwise direction from an end of the multilayer interlayer film and also at a distance of 5 cm inward in the transverse direction from an end of the multilayer interlayer film.

The multilayer interlayer film having the through holes was sandwiched between two sheets of the transparent float glass (30 cm (length)×15 cm (width)×2.5 mm (thickness)), so that a laminate was obtained. The periphery of the laminate was sealed 2 cm from the end with a sealing agent by thermal fusion bonding to encapsulate the air remaining in the embossed parts and in the through holes. The laminate was pressure-bonded at 135° C. and a pressure of 1.2 MPa for 20 minutes, so that the remaining air was mixed into the multilayer interlayer film. Thereby, sheets of laminated glass to be used for bubble formation tests A and B were obtained.

EXAMPLES 2 to 20 and COMPARATIVE EXAMPLES 1 to 2

An interlayer film and a laminated glass were produced by the same procedure as that for Example 1, except that the formulations for the first layer, the second layer and the third layer were changed to the values shown in the following Tables 1 to 2.

The hydroxyl content, degree of acetylation, and degree of butilalization of the polyvinyl acetal resins C to V, and the degree of polymerization of the polyvinyl alcohol (PVA) used for synthesis of the PVB resin of the first layer shown in the following Tables 1 to 2 are the values shown in the Tables 1 to 2. Here, the degree of polymerization of the polyvinyl alcohol (PVA) used for synthesis of the PVB resin in the first layer is shown only for Examples 5 to 20.

(Evaluation)

(1) Sound Insulation

The laminated glass was vibrated with a vibration generator for a dumping test ("Vibration generator G21-005D" produced by Shinken Co., Ltd.). The vibration characteristics obtained thereby were amplified with a mechanical impedance measuring device ("XG-81" produced by Rion), and the vibration spectrum was analyzed with an FFT spectrum analyzer ("FFT analyzer HP3582A" produced by YOKOGAWA Hewlett-Packard, Ltd.).

From the ratio of the loss factor determined thereby and the resonance frequency with the laminated glass, a graph showing the relation between sound frequency (Hz) and sound transmission loss (dB) at 20° C. was generated, and the minimum sound transmission loss (TL value) around the sound frequency of 2,000 Hz was determined. A higher TL value indicates higher sound insulation. A TL value of 35 dB or higher was evaluated as "o", and a TL value of lower than 35 dB was evaluated as "x". Tables 1 to 2 below show the results.

(2) Bubble Formation Test A (Forming State)

Five sheets of the laminated glass for bubble formation test A were produced for each multilayer interlayer film, and were left to stand in a 50° C. oven for 100 hours. After the standing, the sheets of the laminated glass were observed by eye in a plan view for the presence or absence of bubbles and the sizes of the bubbles. The bubble formation state was determined based on the following criteria.

[Criteria of Bubble Formation State in Bubble Formation Test A]

The bubbles in each of the five sheets of the laminated glass were approximated with an ellipse, and the ellipse area was set as a bubble formation area. The average value of the ellipse areas observed in the respective five sheets of the laminated glass was determined, and the ratio (percentage) of the average value of the ellipse areas (bubble formation areas) to the area of the sheet of the laminated glass (30 cm×15 cm) was determined.

oo: No bubble was observed in all the five sheets of the laminated glass o: Ratio of average value of ellipse area (bubble formation area) was lower than 5%

Δ: Ratio of average value of ellipse area (bubble formation area) was 5% or higher and lower than 10% x: Ratio of average value of ellipse area (bubble formation area) was 10% or higher.

(3) Bubble Formation Test B (Bubble Formation State)

Thirty sheets of the laminated glass for bubble formation test B were produced for each multilayer interlayer film, and were left to stand in an oven at 50° C. for 24 hours. After the standing, the sheets of the laminated glass were observed by eye to confirm the number of sheets of the laminated glass in which forms were observed.

(4) Penetration Resistance

The surface temperature of sheets of the laminated glass (300 mm (length)×300 mm (width)) used for the penetration resistance test was adjusted to 23° C. Subsequently, according to JIS R 3212, a rigid sphere having a mass of 2260 g and a diameter of 82 mm was dropped from a height of 4 m on the center of each of six sheets of the laminated glass. The laminated glass was considered to have passed the test if all the six sheets of the laminated glass prevented the rigid sphere from penetrating therethrough within five seconds after the rigid sphere hit the sheets. The laminated glass was considered to have failed the test if three or less sheets of the laminated glass prevented the rigid sphere from penetrating therethrough within five seconds after the rigid sphere hit the sheets. In the case of four sheets, another six sheets of the laminated glass were tested again on the penetration resistance. In the case of five sheets, another sheet of the laminated glass was tested. The glass was considered to have passed the test if the other sheet prevented the rigid sphere from penetrating therethrough within five seconds after the rigid sphere hit the sheet. In the same way, a rigid sphere having a mass of 2260 g and a diameter of 82 mm was dropped from heights of 5 m and 6 m on the center of each of six sheets of the laminated glass to evaluate the penetration resistance of the laminated glass.

(5) Evaluation of Breed Out

Two 10 cm-length lines were drawn in both vertical and horizontal directions with a red oil-based ink on the surface of the obtained interlayer film for marking. The marked interlayer film was placed in a manner that the main surface thereof was located in a plain face which parallels the vertical direction, and was left to stand under conditions of a constant temperature of 23° C. and a constant relative humidity of 28% for one month. The interlayer film after the standing was considered to have passed the test (o) if blurring and running of the oil-based ink were not observed in any of the four lines, and was considered to have failed the test (x) if the blurring and running were observed in at least one of the four lines.

(6) Evaluation of Optical Distortion

Sheets of laminated glass (30 cm (length)×30 cm (width)) for optical distortion evaluation were irradiated with light through a slit from a light source (halogen lamp). Projection distortion on the screen was received by a sensor (camera), and the data was processed by a computer to obtain optical distortion value. The sheets of the laminated glass was considered to have passed the test (o) if the optical distortion value was 1.8 or less, and was considered to have failed the test (x) if the value exceeded 1.8. It can be said that the higher the optical distortion value is, the larger the optical distortion (distortion of image) is.

Tables 1 to 2 show the results thereof. In Tables 1 to 2, 3GO and 3GH, which are kinds of plasticizer, respectively represent triethylene glycol di-2-ethylhexanoate and triethylene glycol di-2-ethylbutyrate.

TABLE I

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Formulation of first layer | Kind of PVB resin | | A | C | D | E | I | J | K | L | M | N | O |
| | Hydroxyl content | mol % | 25.2 | 27.9 | 22.7 | 24.2 | 23.5 | 24.4 | 23.6 | 22.8 | 24.3 | 23.2 | 24.9 |
| | Degree of acetylation | mol % | 12.3 | 12.1 | 0.8 | 0.8 | 8.2 | 8.2 | 12.5 | 12.3 | 15.5 | 15.7 | 25.3 |
| | Degree of butyralization | mol % | 62.5 | 60.0 | 76.5 | 75.0 | 68.3 | 67.4 | 63.9 | 64.9 | 60.2 | 61.1 | 49.8 |
| Resin composition for intermediate layer | Amount of PVB resin | Parts by weight | 100 | 100 | 100 | 100 | 100 | 100 | 100 | 100 | 100 | 100 | 100 |
| | Kind of plasticizer | | 3GO | 3GO | 3GO | 3GO | 3GO | 3GO | 3GO | 3GO | 3GO | 3GO | 3GO |
| | Amount of plasticizer | Parts by weight | 60 | 60 | 60 | 60 | 60 | 70 | 60 | 70 | 60 | 70 | 60 |
| Formulation of second and third layers | Kind of PVB resin | | B | B | B | B | B | B | B | B | B | B | B |
| | Hydroxyl content | mol % | 31.2 | 31.2 | 31.2 | 31.2 | 31.2 | 31.2 | 31.2 | 31.2 | 31.2 | 31.2 | 31.2 |
| | Degree of acetylation | mol % | 0.8 | 0.8 | 0.8 | 0.8 | 0.8 | 0.8 | 0.8 | 0.8 | 0.8 | 0.8 | 0.8 |
| | Degree of butyralization | mol % | 68.0 | 68.0 | 68.0 | 68.0 | 68.0 | 68.0 | 68.0 | 68.0 | 68.0 | 68.0 | 68.0 |
| Resin composition for surface layer | Amount of PVB resin | Parts by weight | 100 | 100 | 100 | 100 | 100 | 100 | 100 | 100 | 100 | 100 | 100 |
| | Kind of plasticizer | | 3GO | 3 GO | 3GO | 3GO | 3GO | 3GO | 3GO | 3GO | 3 GO | 3GO | 3GO |
| | Amount of plasticizer | Parts by weight | 37.5 | 37.5 | 37.5 | 37.5 | 37.5 | 37.5 | 37.5 | 37.5 | 37.5 | 37.5 | 37.5 |

TABLE I-continued

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Difference between hydroxyl content of PVB resin in the first layer and each of hydroxyl contents of PVB resins in the second and third layers | | mol % | 6.0 | 3.3 | 8.5 | 7 | 7.7 | 6.8 | 7.6 | 8.4 | 6.9 | 8 | 6.3 |
| Evaluation | Sound insulation: TL value | | ○ | ○ | ○ | ○ | ○ | ○ | ○ | ○ | ○ | ○ | ○ |
| | Bubble formation test A (Bubble formation state) | | ○ | ○○ | Δ | ○ | ○ | ○ | ○ | Δ | ○ | Δ | ○ |
| | Bubble formation test B (Bubble formation state) | | 12 | 0 | 15 | 10 | 13 | 13 | 15 | 14 | 11 | 17 | 21 |
| | Penetration resistance | 4 m | passed | passed | passed | passed | passed | passed | passed | passed | passed | passed | passed |
| | | 5 m | passed | passed | passed | passed | passed | passed | passed | passed | passed | passed | passed |
| | | 6 m | passed | passed | passed | passed | passed | passed | passed | passed | passed | passed | passed |
| | Bleed out | | ○ | ○ | ○ | ○ | ○ | ○ | ○ | ○ | ○ | ○ | ○ |
| | Optical distortion | | ○ | ○ | ○ | ○ | ○ | ○ | ○ | ○ | ○ | ○ | ○ |
| Degree of polymerization of PVB (PVA) resin in the first layer | | | — | — | — | — | 1700 | 2000 | 2350 | 1700 | 2450 | 1800 | 2500 |

TABLE 2

| | | | Ex. 12 | Ex. 13 | Ex. 14 | Ex. 15 | Ex. 16 | Ex. 17 | Ex. 18 | Ex. 19 | Ex. 20 | Comp. Ex. 1 | Comp. Ex. 2 |
|---|---|---|---|---|---|---|---|---|---|---|---|---|---|
| Formulation of first layer | Kind of PVB resin | | P | C | Q | R | S | T | U | V | E | F | G |
| | Hydroxyl content | mol % | 25.0 | 27.9 | 22.2 | 24.6 | 23.3 | 25.6 | 22.1 | 23.1 | 24.2 | 22.4 | 19.5 |
| | Degree of acetylation | mol % | 29.5 | 12.1 | 3.2 | 3.1 | 5.2 | 5.5 | 7.6 | 7.4 | 0.8 | 12.6 | 1.5 |
| | Degree of butyralization | mol % | 45.5 | 60.0 | 74.6 | 72.3 | 71.5 | 68.9 | 70.3 | 69.5 | 75.0 | 65.0 | 79.0 |
| Resin composition for intermediate layer | Amount of PVB resin | Parts by weight | 100 | 100 | 100 | 100 | 100 | 100 | 100 | 100 | 100 | 100 | 100 |
| | Kind of plasticizer | | 3GO | 3GH | 3GO | 3GO | 3GO | 3GO | 3GO | 3GO | 3GH | 3GO | 3GO |
| | Amount of plasticizer | Parts by weight | 70 | 60 | 60 | 70 | 60 | 70 | 60 | 70 | 70 | 60 | 60 |
| Formulation of second and third layers | Kind of PVB resin | | B | B | B | B | B | B | B | B | B | B | H |
| | Hydroxyl content | mol % | 31.2 | 31.2 | 31.2 | 31.2 | 31.2 | 31.2 | 31.2 | 31.2 | 31.2 | 31.2 | 28.8 |
| | Degree of acetylation | mol % | 0.8 | 0.8 | 0.8 | 0.8 | 0.8 | 0.8 | 0.8 | 0.8 | 0.8 | 0.8 | 1.2 |
| | Degree of butyralization | mol % | 68.0 | 68.0 | 68.0 | 68.0 | 68.0 | 68.0 | 68.0 | 68.0 | 68.0 | 68.0 | 70.0 |
| Resin composition for surface layer | Amount of PVB resin | Parts by weight | 100 | 100 | 100 | 100 | 100 | 100 | 100 | 100 | 100 | 100 | 100 |
| | Kind of plasticizer | | 3GO | 3GH | 3GO | 3GO | 3GO | 3GO | 3GO | 3GO | 3GH | 3GO | 3GO |
| | Amount of plasticizer | Parts by weight | 37.5 | 37.5 | 37.5 | 37.5 | 37.5 | 37.5 | 37.5 | 37.5 | 37.5 | 37.5 | 37.5 |
| Difference between hydroxyl content of PVB resin in the first layer and each of hydroxyl contents of PVB resins in the second and third layers | | mol % | 6.2 | 3.3 | 9 | 6.6 | 7.9 | 5.6 | 9.1 | 8.1 | 7 | 8.8 | 9.3 |
| Evaluation | Sound insulation: TL value | | ○ | ○ | ○ | ○ | ○ | ○ | ○ | ○ | ○ | ○ | ○ |
| | Bubble formation test A (Bubble formation state) | | ○ | ○○ | Δ | ○ | Δ | ○○ | Δ | Δ | ○ | x | x |
| | Bubble formation test B (Bubble formation state) | | 21 | 0 | 14 | 12 | 8 | 1 | 12 | 9 | 10 | 27 | 24 |
| | Penetration resistance | 4 m | passed | passed | passed | passed | passed | passed | passed | passed | passed | passed | passed |
| | | 5 m | passed | passed | passed | passed | passed | passed | passed | passed | passed | passed | passed |
| | | 6 m | passed | passed | passed | passed | passed | passed | passed | passed | passed | passed | passed |
| | Bleed out | | ○ | ○ | ○ | ○ | ○ | ○ | ○ | ○ | ○ | ○ | ○ |
| | Optical distortion | | ○ | ○ | ○ | ○ | ○ | ○ | ○ | ○ | ○ | ○ | ○ |
| Degree of polymerization of PVB (PVA) resin in the first layer | | | 2500 | 2500 | 2300 | 1750 | 1900 | 2300 | 2000 | 2000 | 1700 | — | — |

Explanation of Symbols

1 Interlayer film
2 First layer
2*a* One face
2*b* The other face
3 Second layer
3*a* Outer surface
4 Third layer
4*a* Outer surface
11 Laminated glass
12 First laminated glass component
13 Second laminated glass component

The invention claimed is:

1. An interlayer film for a laminated glass, comprising a first layer that contains a polyvinyl acetal resin and a plasticizer, and a second layer that contains a polyvinyl acetal resin and a plasticizer and is laminated on one face of the first layer, wherein an amount of the plasticizer for each 100 parts by weight of the polyvinyl acetal resin in the first layer is 50 parts by weight or higher, the hydroxyl content of the polyvinyl acetal resin in the first layer is lower than the hydroxyl content of the polyvinyl acetal resin in the second layer, the difference between the hydroxyl content of the polyvinyl acetal resin in the first layer and the hydroxyl content of the polyvinyl acetal resin in the second layer is at most 9.2 mol %, and the polyvinyl acetal resin in the first layer has a degree of acetylation of at most 8 mol % when the difference between the hydroxyl content of the polyvinyl acetal resin in the first layer and the hydroxyl content of the polyvinyl acetal resin in the second layer is more than 8.5 mol % and at most 9.2 mol %.

2. The interlayer film for a laminated glass according to claim 1, wherein the polyvinyl acetal resin in the first layer has a degree of acetylation of higher than 8 mol % when the difference between the hydroxyl content of the polyvinyl acetal resin in the first layer and the hydroxyl content of the polyvinyl acetal resin in the second layer is at most 8.5 mol %.

3. The interlayer film for a laminated glass according to claim 2, wherein the polyvinyl acetal resin in the first layer has a degree of acetylation of higher than 8 mol % and lower than 20 mol % when the difference between the hydroxyl content of the polyvinyl acetal resin in the first layer and the hydroxyl content of the polyvinyl acetal resin in the second layer is at most 8.5 mol %.

4. The interlayer film for a laminated glass according to claim 2, wherein the polyvinyl acetal resin in the first layer has a degree of acetylation of higher than 8 mol % and a degree of acetalization of 52.5 mol % or higher when the difference between the hydroxyl content of the polyvinyl acetal resin in the first layer and the hydroxyl content of the polyvinyl acetal resin in the second layer is at most 8.5 mol %.

5. The interlayer film for a laminated glass according to claim 2, wherein the polyvinyl acetal resin in the first layer has a degree of acetylation of higher than 8 mol % and a hydroxyl content of at most 28 mol % when the difference between the hydroxyl content of the polyvinyl acetal resin in the first layer and the hydroxyl content of the polyvinyl acetal resin in the second layer is at most 8.5 mol %.

6. The interlayer film for a laminated glass according to claim 2, wherein the polyvinyl acetal resin in the first layer is a polyvinyl acetal resin which is obtained by acetalizing a polyvinyl alcohol having a degree of polymerization of higher than 1700 and at most 3000.

7. The interlayer film for a laminated glass according to claim 2, wherein the polyvinyl acetal resin in the second layer has a hydroxyl content of at most 33 mol %.

8. The interlayer film for as laminated glass according to claim 2, wherein the difference between the hydroxyl content of the polyvinyl acetal resin in the first layer and the hydroxyl content of the polyvinyl acetal resin in the second layer is at most 8.5 mol %.

9. The interlayer film for a laminated glass according to claim 1, wherein the polyvinyl acetal resin in the first layer has a degree of acetylation of at most 8 mol % and a hydroxyl content of lower than 31.5 mol %.

10. The interlayer film for a laminated glass according to claim 1, wherein the polyvinyl acetal resin in the first layer has a degree of acetylaton of at most 8 mol % and a degree of acetalization of 68 mol % or higher.

11. The interlayer film for a laminated glass according to claim 1, wherein the polyvinyl acetal resin in the first layer has a hydroxyl content of lower than 31.5 mol % and a degree of acetalization of 68 mol % or higher.

12. The interlayer film for a laminated glass according to claim 1, wherein an amount of the plasticizer fear each 100 parts by weight of the polyvinyl acetal resin in the first layer is larger than an amount of the plasticizer for each 100 parts by weight of the polyvinyl acetal resin in the second layer.

13. The interlayer film for a laminated glass according to claim 12, wherein an amount of the plasticizer for each 100 parts by weight of the polyvinyl acetal resin in the first layer is larger by at least 20 parts by weight than an amount of the plasticizer for each 100 parts by weight of the polyvinyl acetal resin in the second layer.

14. The interlayer film for a laminated glass according to claim 1, further comprising a third layer that contains a polyvinyl acetal resin and a plasticizer and is laminated on the other face of the first layer, wherein the hydroxyl content of the polyvinyl acetal resin in the first layer is lower than the hydroxyl content of the polyvinyl acetal resin in the third layer, the difference between the hydroxyl content of the polyvinyl acetal resin in the first layer and the hydroxyl content of the polyvinyl acetal resin in the third layer is at most 9.2 mol %, and the polyvinyl acetal resin in the first layer has a degree of acetylation of at most 8 mol % when the difference between the hydroxyl content of the polyvinyl acetal resin in the first layer and the hydroxyl content of the polyvinyl acetal resin in the third layer is more than 8.5 mol % and at most 9.2 mol %.

15. The interlayer film for a laminated glass according to claim 14, wherein the polyvinyl acetal resin in the first layer has a degree of acetylation of higher than 8 mol % when the difference between the hydroxyl content of the polyvinyl acetal resin in the first layer and the hydroxyl content of the polyvinyl acetal resin in the third layer is at most 8.5 mol %.

16. The interlayer film for a laminated glass according to claim 15, wherein the polyvinyl acetal resin in the third layer has a hydroxyl content of at most 33 mol %.

17. The interlayer film for a laminated glass according to claim 14, wherein the polyvinyl acetal resin in the first layer has a hydroxyl content of lower than 31.5 mol % and a degree of acetalization of 68 mol % or higher.

18. The interlayer film for a laminated glass according to claim 14, wherein an amount of the plasticizer for each 100 parts by weight of the polyvinyl acetal resin in the first layer is larger than an amount of the plasticizer for each 100 parts by weight of the polyvinyl acetal resin in each of the second layer and the third layer.

19. The interlayer film for a laminated glass according to claim 14, wherein the polyvinyl acetal resin in each of the first layer, the second layer and the third layer includes a polyvinyl butyral resin, and the plasticizer in each of the first layer, the second layer and the third layer includes triethylene glycol di-2-ethylhexanoate.

20. A laminated glass comprising:

a first laminated glass component and a second laminated glass component, and an interlayer film sandwiched between the first laminated glass component and the second laminated glass component, wherein the interlayer film is the interlayer film for a laminated glass according to claim 1.

* * * * *